(12) United States Patent
Nodenot et al.

(10) Patent No.: US 7,778,323 B1
(45) Date of Patent: Aug. 17, 2010

(54) SYSTEM AND METHOD FOR PROVIDING A PARAMETERIZED ANALOG FEEDBACK LOOP FOR CONTINUOUS TIME ADAPTIVE EQUALIZATION INCORPORATING LOW FREQUENCY ATTENUATION GAIN COMPENSATION

(75) Inventors: Nicolas Nodenot, Mountain View, CA (US); Laurence D. Lewicki, Menlo Park, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 1018 days.

(21) Appl. No.: 11/044,988

(22) Filed: Jan. 27, 2005

(51) Int. Cl.
 *H03H 7/30* (2006.01)
(52) U.S. Cl. ..................................... 375/233
(58) Field of Classification Search .............. 375/229, 375/232, 233
See application file for complete search history.

(56) References Cited

U.S. PATENT DOCUMENTS

| | | | |
|---|---|---|---|
| 5,717,716 A * | 2/1998 | Doyle | 375/232 |
| 5,841,810 A | 11/1998 | Wong et al. | |
| 6,614,842 B1 * | 9/2003 | Chou et al. | 375/232 |
| 2003/0043897 A1 * | 3/2003 | Papanikolaou et al. | 375/229 |
| 2003/0053534 A1 * | 3/2003 | Sivadas et al. | 375/229 |

OTHER PUBLICATIONS

Jong-Sang Choi, et al., "A 0.18-μm CMOS 3.5-Gb/s Continuous-Time Adaptive Cable Equalizer Using Enhanced Low-Frequency Gain Control Method", IEEE Journal of Solid-State Circuits, vol. 39, No. 3, Mar. 2004, p. 419-425.

Mohammad Hossein Shakiba, "A 2.5Gb/s Adaptive Cable Equalizer", 1999 IEEE International Solid-State Circuits Conference, 3 pages.

* cited by examiner

*Primary Examiner*—Kevin M Burd

(57) ABSTRACT

A system and a method are disclosed for providing a parameterized analog feedback loop for continuous time adaptive equalization that incorporates low frequency attenuation gain compensation. N adaptive equalizer stages are coupled in series and a slicer circuit is coupled to the last (Nth) adaptive equalizer stage. A single equalizer adaptation control loop controls the frequency response of the adaptive equalizer stages to compensate for the attenuation of a lossy channel. The single equalizer adaptation control loop also compensates for the direct current (DC) loss in the lossy channel by modulating a bias current in the slicer circuit to scale the low frequency feedback with adaptation coefficients that correlate with channel length.

20 Claims, 9 Drawing Sheets

SYSTEM AND METHOD FOR PROVIDING A PARAMETERIZED ANALOG FEEDBACK LOOP FOR CONTINUOUS TIME ADAPTIVE EQUALIZATION INCORPORATING LOW FREQUENCY ATTENUATION GAIN COMPENSATION

TECHNICAL FIELD OF THE INVENTION

The present invention is generally directed to the manufacture of semiconductor circuits used in high speed telecommunication devices and, in particular, to a system and method for providing a parameterized analog feedback loop for continuous time adaptive equalization that incorporates low frequency attenuation gain compensation.

BACKGROUND OF THE INVENTION

Frequency equalization is often required in high speed telecommunication links to compensate for the high frequency attenuation and nonlinear group delay characteristics of lossy channels. These deleterious effects are due to the distributed capacitance, resistance and inductance found in lossy channels (e.g., coaxial cable, twisted pair wiring, and circuit board traces) that are used to connect transmitters and receivers across long distances in high speed telecommunication links.

When high speed communication signals are passed through a lossy channel, they exhibit time domain distortion and loss of symmetry due to the high frequency attenuation and nonlinear group delay characteristics. The loss of symmetry causes the placement of zero crossings to be dependent on the history of previous symbols sent through the channel. In this way, the resulting placement in time of the zero crossings is variable and appears to be "jitter." This jitter is defined as data dependent "deterministic jitter" (designated with the letters "DJ").

It is desirable to provide the users of high speed telecommunication links with a frequency equalizer that senses the loss in the channel and automatically adapts to provide a boost that compensates for this loss within the frequency band of interest. From a frequency domain standpoint, the equalizer should have the inverse Fourier transform of the lossy channel for frequencies up to half the data rate to satisfy the Nyquist criteria. When the equalization procedure is done correctly, the deterministic jitter (DJ) is minimized in the data path. Minimizing deterministic jitter (DJ) is desirable in order to reduce errors in the subsequent clock and data recovery subsystem of the receiver.

It is also desirable that the servo mechanism of the adaptive equalizer not require sampling clocks in order to operate. This is because the sampling clocks would need to be generated by a clock recovery system in order to be coherent with the received data. The clock recovery system would require its own feedback loop and the interaction of the clock recovery feedback loop with the equalizer adaptation loop has the potential to cause instabilities that would make the system difficult to apply in a wide range of customer applications.

It is also desirable that the adaptive equalizer servo loop works well with multiple data rates in order to simplify customer usage in systems that require backward compatibility with older standards (and therefore lower data rates).

In addition, the adaptive equalizer should not add excessive amounts of thermal noise to the data path. Thermal noise adds random jitter (designated with the letters "RJ") to the data path output.

The "total jitter" within the data path is the sum of the deterministic jitter (DJ) that is due to the lossy channel and the random jitter (RJ) that is due to the thermal noise of the adaptive equalizer. It is desirable that an adaptive equalizer have an unconditionally stable servo loop that minimizes the "total jitter" present in the data path.

Thermal noise generally increases as the equalizer boost is increased. At the same time, as the channel loss is increased, it follows that it will be necessary for the servo loop to increase the adaptive equalizer boost in order to reduce the deterministic jitter (DJ). In practice, there is an upper limit to the amount of boost than an equalizer can add. This upper limit is set by the amount of random jitter (RJ) that is added to the overall system by the equalizer data path as a function of the boost required to compensate high frequency attenuation of the lossy channel.

Implementations of practical high speed integrated circuit boost stages use RC time constants to create increased high frequency gain. As a result, a practical transistor implementation of the equalizer can only provide a six decibel (6 dB) per octave boost per stage. Lossy channels exhibit a transfer characteristic that may be described as follows:

$$H(j2\pi f) = e^{-jkL\sqrt{f}} \quad (1)$$

The constant "k" in Equation (1) is a constant that is determined empirically. The letter "L" represents the cable length. It can be shown from Equation (1) that the slope of the transfer characteristic is a function of the cable length L. It follows that the equalization of very lossy cables requires a multi-stage topology of the type shown in FIG. 1.

FIG. 1 illustrates a prior art multi-stage adaptive equalizer circuit 100 comprising N stages (110, 120, 130) and a slicer circuit (140). Input is provided to the first adaptive equalizer stage 110 (Stage 1). The output of stage 110 (Stage 1) is provided to the second adaptive equalizer stage 120 (Stage 2). The output of stage 120 (Stage 2) is provided to the next adaptive equalizer stage (not shown). The output of the next to the last adaptive equalizer stage (not shown) is provided to the last adaptive equalizer stage 130 (Stage N). The output of stage 130 (Stage N) is provided to the slicer circuit (140).

Each of the adaptive equalizer stages (110, 120, 130) shown in FIG. 1 comprises a circuit of the type shown in FIG. 2. FIG. 2 illustrates a prior art adaptive equalizer stage 200 that comprises a gain unit 210, an adder circuit 220, a high pass filter circuit 230 and a tunable high frequency gain unit 240. The direct current (DC) path comprises the gain unit 210 and the adder circuit 220. The high pass filter circuit 230 and the tunable high frequency gain unit 240 are coupled in parallel with the direct current (DC) path.

The boost that is provided by adaptive equalizer circuit 200 is adjusted by the tunable high frequency gain unit 240. The variable gain is designated by the symbol "$\alpha_i$" ("alpha sub i"). The variable gain can range from zero ("0") for "no boost" to one ("1") for "maximum boost." The resulting transfer function of the adaptive equalizer stage can realize an approximation of the inverse Fourier transform of the lossy channel.

The accuracy of this approximation will be limited by the bandwidth limit of the circuit and also by the fact that in practical implementations, the high pass filter circuit 230 will only have a six decibel (6 dB) per octave slope due to the nature of a single RC time constant. If the slope of the attenuation of the lossy channel is greater than six decibels (6 dB) per octave, then several equalizer boost stages be cascaded in series to better approximate the inverse Fourier transfer characteristic of the lossy channel. The improved approximation of the inverse Fourier transfer characteristic will result in lower deterministic jitter (DJ) output.

The next challenge to be solved in the design of an efficient adaptive equalizer circuit is to create a servo loop that controls the variable gain "α" of each of the individual stages so that the lossy channel deterministic jitter (DJ) is minimized. In a multi-stage adaptive equalizer system the cascaded adaptive equalizer stages are driven in a thermometer fashion in which only the first stage (i.e., Stage 1) provides a high frequency boost to compensate for moderately lossy channels (implying less loss) and in which the variable gain "α" for the remaining stages is held at zero ("0") so that the remaining stages realize flat gain characteristics.

Then the next stage (i.e., Stage 2) is boosted when additional equalization for lossier channels is required. The remaining adaptive equalizer stages are brought on line as required. Finally, all of the adaptive equalizer stages are used to provide a boost for the lossiest channels.

In order to better understand the operation of the servo feedback system that controls the variable gain "α" coefficients of the adaptive equalizer boost stages, the data path will now be described in more detail. FIG. 3 illustrates a block diagram of a prior art transmitter 310, a lossy channel 320, the adaptive equalizer stages (110, 120, 130), and slicer circuit 140. FIG. 3 also indicates the corresponding frequency domain responses of the various blocks.

The slicer circuit 140 is a limiting amplifier. The slicer circuit 140 constitutes the first nonlinear element in the data path. Assuming that the adaptive equalizer stages are correctly tuned, the frequency content within the frequency equalization range at the input and at the output of the circuit shown in FIG. 3 is identical (except for a scaling factor that is equal to Gs/[(Gc)(Gtx)]. The term Gs represents the amplitude of the slicer output. The term Gc represents the DC gain of the channel. The term Gtx represents the amplitude of the cable driver output.

In the manner described above a channel equalizer may be constructed from a cascade of adaptive equalizer stages in which each of the adaptive equalizer stages has a nominal slope of six decibels (6 dB) per octave. It is desirable for the channel equalizer to have a servo loop that automatically adapts the variable gain "α" coefficients of the adaptive equalizer stages.

It may be seen from FIG. 3 that one way to adapt the variable gain "α" coefficients is to compare the energy of the signal at the output of the last adaptive equalizer stage 130 (Stage N) to the energy of the "squared up" signal at the output of the slicer 140. This approach would work well if the lossy channel 320 had only a high frequency response loss. In actuality the lossy channel 320 also has a low frequency "direct current" (DC) loss due to finite resistance. It is therefore necessary to compensate for the DC attenuation loss as well.

That is, the feedback signal that is used to control the servo adaptation mechanism cannot be based solely on a comparison between the input and output signals of the slicer 140. Some additional mechanism must be included that compensates for the DC attenuation loss of the lossy channel 320.

One prior art approach to the problem uses a variable gain amplifier (VGA) instead of a unity gain amplifier in each of the adaptive equalizer stages. This approach is described in a paper by J. Choi, M. Hwang and D. Jeong entitled "A 0.18 μm CMOS 3.5 Gb/s Continuous-Time Adaptive Cable Equalizer Using Enhanced Low-Frequency Gain Control Method" in IEEE J. Solid-State Circuits, Volume 39, pp. 419-425 (March 2004).

FIG. 4 illustrates a prior art adaptive equalizer circuit 400 of the type employed in the method of J. Choi et al. Adaptive equalizer circuit 400 comprises a variable gain amplifier (VGA) 410, an adder circuit 420, a high pass filter circuit 430 and a tunable high frequency gain unit 440. The direct current (DC) path comprises the variable gain amplifier (VGA) 410 and the adder circuit 420. The high pass filter circuit 430 and the tunable high frequency gain unit 440 are coupled in parallel with the direct current (DC) path.

The variable gain amplifier (VGA) is controlled by a separate feedback loop (not shown) that adjusts directly in response to the low frequency content of the signal. Therefore, the final topology employed in the method of J. Choi et al. requires two nested control loops. One of the control loops is for the low frequency variable gain amplifier (VGA) gain. The other control loop is for the adaptation of the adaptive equalizer stages.

It is very difficult to guarantee the simultaneous convergence of two nested control loops under all conditions for customer applications. If there is a non-monotonic convergence space, both control loops can interfere with each other. This can result in multiple non-optimal locking points.

A second prior art approach is described in a paper by M. H. Shabika entitled "A 2.5 Gb/s Adaptive Cable Equalizer" in IEEE Int. Solid-State Circuits Conference Dig. Tech. Papers, pp. 396-397, February 1999. Instead of using a separate control loop, the variable gain amplifier (VGA) can be driven from the same adaptive equalizer main loop. But the approach suggested by Shabika still does not overcome the intrinsic limitation of having a DC gain in the equalizer.

To better understand the limitation, note that adding a DC path gain greater than unity in parallel with the high pass filter (HPF) boosting stage reduces the effective amount of boost. Consider a cable having a three decibel (3 dB) attenuation point at a frequency $F_{cutoff}$. Its equalizer counterpart is required to compensate for the high frequency attenuation. With a unity gain DC path, the equalizer needs a gain of three decibels (3 dB) at this frequency. If on the other hand, a variable gain amplifier (VGA) is used in the DC path, the equalizer will have a DC gain of 1/G0 where G0 is the DC loss of the cable.

As a consequence, the equalizer gain is now shifted up to 3 dB+20 log (1/G0) at the frequency $F_{cutoff}$. For an optimum design, this additional requirement will translate into higher power drawn in the equalizer stage.

Therefore, there is a need in the art for a system and method that is capable of providing an improved adaptive equalizer circuit that overcomes the above identified deficiencies of the prior art.

SUMMARY OF THE INVENTION

To address the above-discussed deficiencies of the prior art, it is a primary object of the present invention to provide a system and method for providing an improved adaptive equalizer circuit.

In one advantageous embodiment, the adaptive equalizer circuit of the invention comprises N adaptive equalizer stages that are coupled together in a cascaded series. A slicer circuit is coupled to the last (Nth) adaptive equalizer stage. A single equalizer adaptation control loop controls the frequency response of the adaptive equalizer stages to compensate for the attenuation of a lossy channel. The single equalizer adaptation control loop also compensates for the direct current (DC) loss in the lossy channel by modulating a bias current in the slicer circuit to scale the low frequency feedback with adaptation coefficients that correlate with channel length.

The adaptive equalization circuit comprises a single equalizer adaptation control loop that is unconditionally stable. The single equalizer adaptation control loop converges to a unique solution point.

It is an object of the present invention to provide a system and method for providing a parameterized analog feedback loop in an adaptive equalization circuit for continuous time adaptive equalization that incorporates low frequency attenuation gain compensation.

It is also an object of the present invention to provide an adaptive equalization circuit that comprises a single equalizer adaptation control loop that is unconditionally stable.

It is yet another object of the present invention to provide an adaptive equalization circuit that comprises a single equalizer adaptation control loop that converges to a unique solution point.

It is another of object of the present invention to provide an adaptive equalization circuit that comprises a single equalizer adaptation control loop that (1) controls the frequency response of a plurality of adaptive equalizer stages to compensate for the attenuation of a lossy channel, and that (2) compensates for a direct current (DC) loss in the lossy channel by modulating a bias current in a slicer circuit to scale the low frequency feedback with adaptation coefficients that correlate with channel length:

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
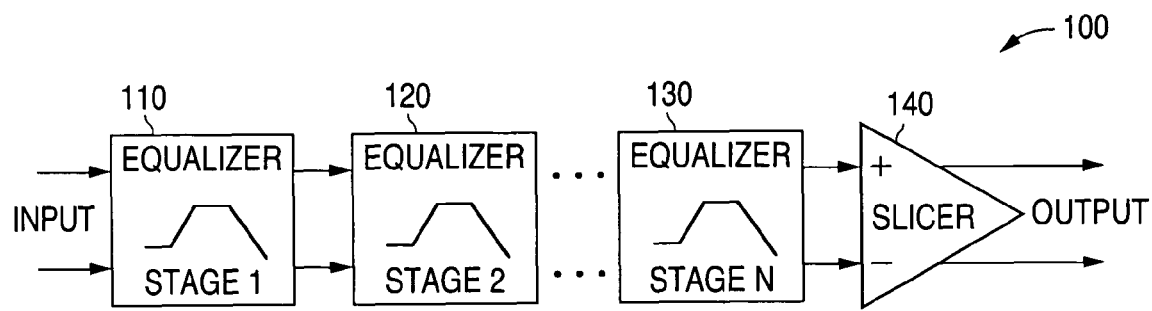
FIG. 1 illustrates a block diagram of a prior art multi-stage adaptive equalizer circuit comprising N adaptive equalizer stages and a slicer circuit.

FIGS. 1 through 12 and the various embodiments used to describe the principles of the present invention in this patent document are by way of illustration only and should not be construed in any way to limit the scope of the invention. Those skilled in the art will understand that the principles of the present invention may be implemented in any type of suitably arranged circuitry for providing an adaptive equalizer.

To simplify the drawings the reference numerals from previous drawings will sometimes not be repeated for structures that have already been identified.

As will be more fully described below, the invention described in this patent document decouples the direct current (DC) attenuation problem from the high frequency path of the adaptive equalizer circuitry. The invention also provides much more flexibility in the tuning of the control loop. The adaptive equalizer feedback loop of the present invention compensates for the direct current (DC) attenuation while not having any of the previously discussed deficiencies of the prior art.

Figure 5:
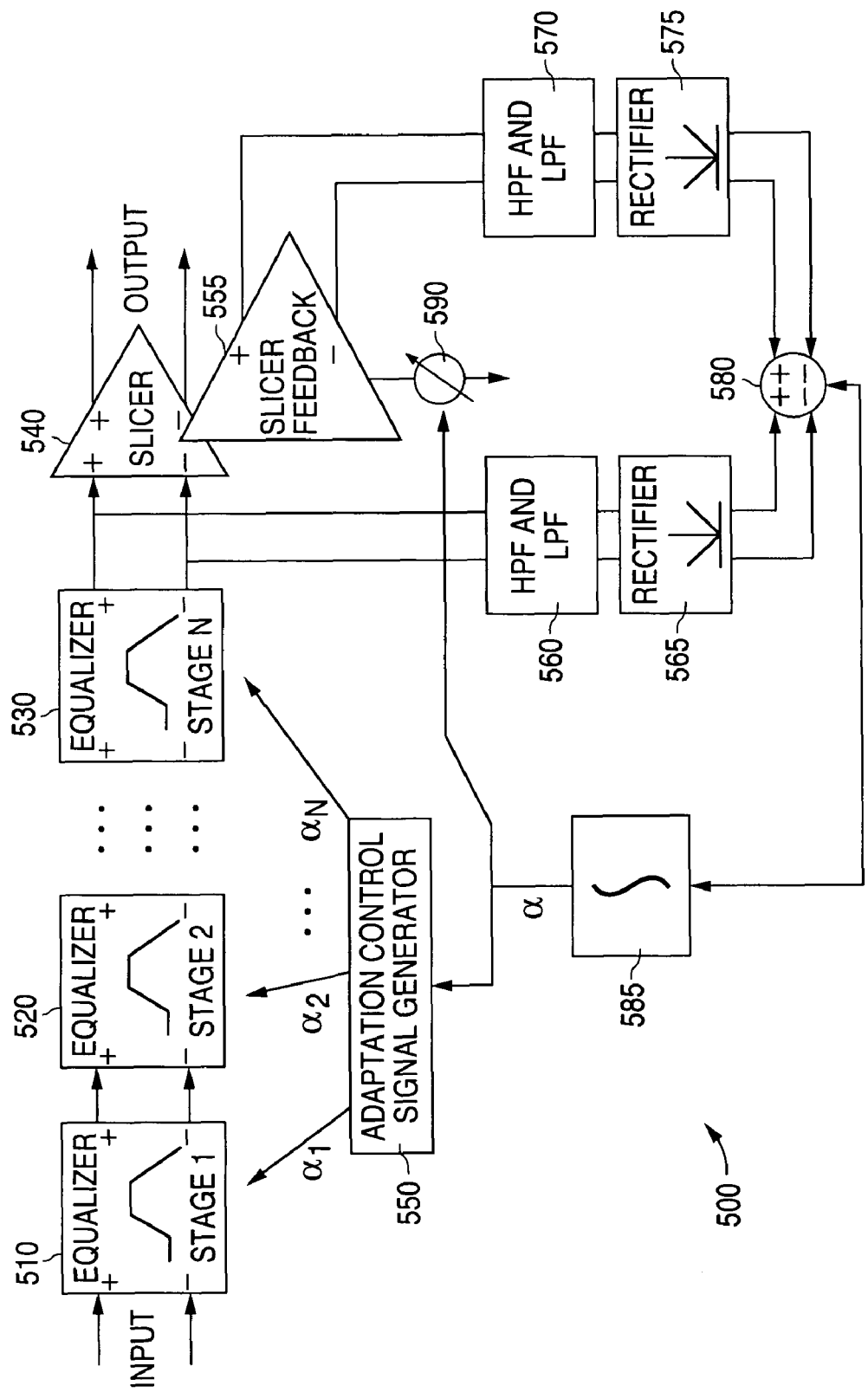
FIG. 5 illustrates a block diagram showing the structure and operation of an advantageous embodiment of an adaptive feedback control loop of an adaptive equalizer circuit of the present invention.

FIG. 5 illustrates a block diagram showing the structure and operation of an advantageous embodiment of an adaptive feedback control loop of the present invention. The adaptive equalizer circuit 500 of the present invention comprises N adaptive equalization stages (510, 520, 530) and a slicer circuit (540). Input is provided to the first adaptive equalizer stage 510 (Stage 1). The output of stage 510 (Stage 1) is provided to the second adaptive equalizer stage 520 (Stage 2). The output of stage 520 (Stage 2) is provided to the next adaptive equalizer stage (not shown). The output of the next to the last adaptive equalizer stage (not shown) is provided to the last adaptive equalizer stage 530 (Stage N). The output of stage 530 (Stage N) is provided to the slicer circuit (540).

Figure 2:
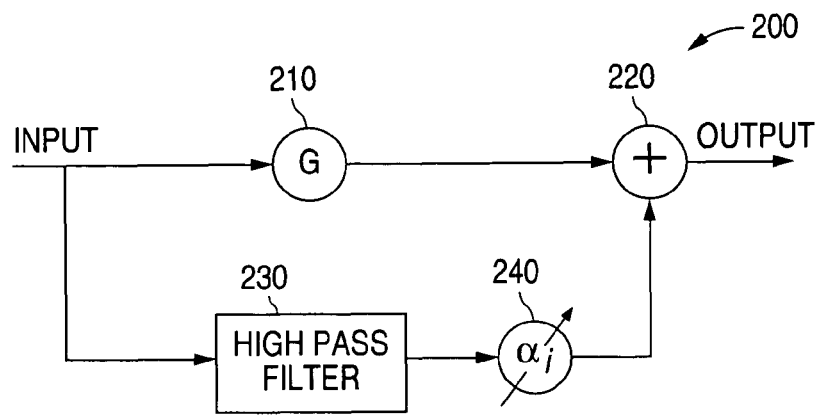
FIG. 2 illustrates a block diagram of a prior art adaptive equalizer circuit that comprises a gain unit, an adder circuit, a high pass filter circuit and a tunable high frequency gain unit.
Figure 4:
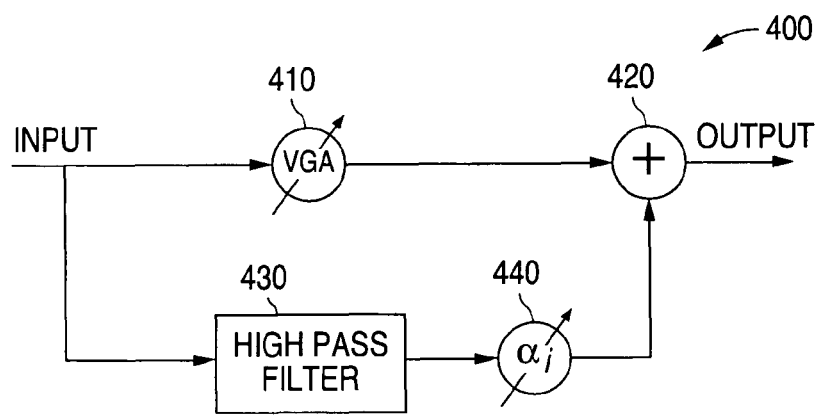
FIG. 4 illustrates a block diagram of a prior art adaptive equalizer circuit that comprises a variable gain amplifier, an adder circuit, a high pass filter circuit and a tunable high frequency gain unit.
Figure 3:
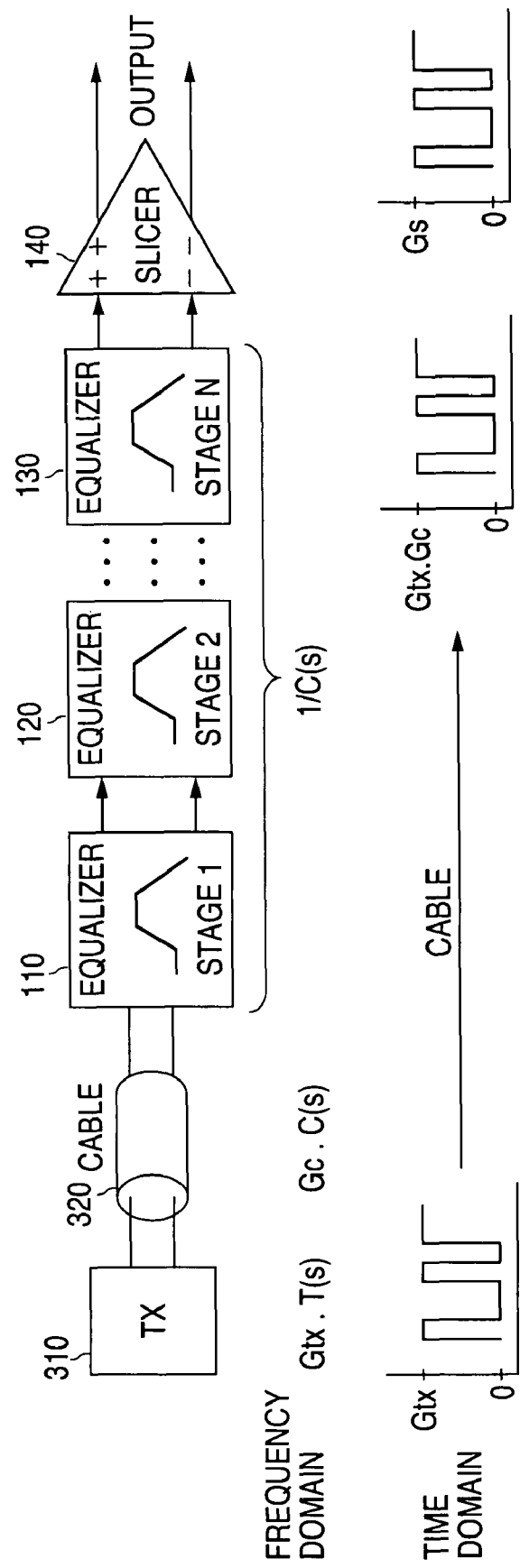
FIG. 3 illustrates a block diagram of a prior art transmitter, a lossy channel, an adaptive equalizer data path, and a slicer circuit.

Each of the adaptive equalizer stages (510, 520, 530) shown in FIG. 5 comprises a circuit of the type shown in FIG. 2. That is, each of the adaptive equalizer stages shown in FIG. 5 has a unity gain DC path and a high frequency path coupled in parallel. The gain of the high frequency path is provided by a tunable high frequency gain unit 240. As will be described below, the variable gain "$\alpha_i$" is controlled by an adaptation control signal generator 550. In each of the adaptive equalizer stages (510, 520, 530) the variable gain can range from zero ("0") for "no boost" to one ("1") for "maximum boost."

The slicer circuit 540 has two separate outputs. The first output from slicer circuit 540 is a constant amplitude data path that is typically routed to a transmit buffer (not shown). The second output from slicer circuit 540 is a feedback output. The feedback output of the slicer circuit 540 is represented in FIG. 5 by a triangle that is designated as slicer feedback 555. A feedback voltage signal that is designated with the letter "$\alpha$" ("alpha") is provided to the slicer feedback 555 to control the signal strength of the slicer feedback 555. The signal strength of the slicer feedback 555 is set to match the expected low frequency attenuation for long runs of the media that is in use (e.g., coaxial cable, twisted pair, circuit board traces).

The output signals from the last adaptive equalizer stage 530 (Stage N) are provided as inputs to a first high pass filter (HPF) and low pass filter (LPF) unit 560. The filtered signals from the first HPF and LFP unit 560 are provided as inputs to a first nonlinear energy detector unit 565 that determines signal strength. The function of the first nonlinear energy detector unit 565 is shown in FIG. 5 as a full wave rectification rectifier 565. It is understood, however, that this function could be implemented with some other types of circuitry (e.g., an absolute value detector or a squaring function unit).

Similarly, the output signals of the slicer feedback 555 are provided as inputs to a second high pass filter (HPF) and low pass filter (LPF) unit 570. The filtered signals from the second HPF and LFP unit 570 are provided as inputs to a second nonlinear energy detector unit 575 that determines signal strength. The function of the second nonlinear energy detector unit 575 is shown in FIG. 5 as a full wave rectification rectifier 575. It is understood, however, that this function could be implemented with some other types of circuitry (e.g., an absolute value detector or a squaring function unit).

The signal strengths of the output signals of the last adaptive equalizer stage 530 (Stage N) (which are identical to the input signals that are provided to slicer circuit 540) and the signal strengths of the output signals of the slicer feedback 555 are compared (i.e., subtracted) in adder unit 580 to obtain an error signal.

The error signal from adder unit 580 is provided to an integrator unit 585. The integrator unit 585 integrates the error signal to generate the feedback voltage signal "$\alpha$" ("alpha"). The feedback voltage signal "$\alpha$" is provided directly to a variable signal controller 590 associated with the slicer feedback 555. Slicer feedback 555 uses the feedback voltage signal "$\alpha$" to adapt its output level to the equalizer output signal amplitude. In this way slicer feedback 555 controls its output signal strength.

The feedback voltage signal "$\alpha$" is also provided to the adaptation control signal generator 550. The adaptation control signal generator 550 uses the feedback voltage signal "$\alpha$" to drive the individual adaptive equalizer stages (510, 520, 530). Adaptation control signal generator 550 provides a first value of variable gain "$\alpha_1$" to adaptive equalizer stage 510. Adaptation control signal generator 550 provides a second value of variable gain "$\alpha_2$" to adaptive equalizer stage 530. Adaptation control signal generator 550 provides a Nth value of variable gain "$\alpha_N$" to adaptive equalizer stage 530.

The adaptive equalizer circuit 500 of the present invention provides a single loop topology that is unconditionally stable. The uniqueness of the locking point is now guaranteed because the convergence space of the single loop topology is one dimensional and monotonic.

At the same time the design constraints that are applicable to the adaptive equalizer stages (510, 520, 530) are relieved. Maximum boost can now be achieved because the DC path has unity gain in the adaptive equalizer stages (510, 520, 530). The slicer circuit (540, 555) now compensates for the DC attentuation that is inherent in the lossy media (e.g., coaxial cable, twisted pair, printed circuit traces).

Figure 6:
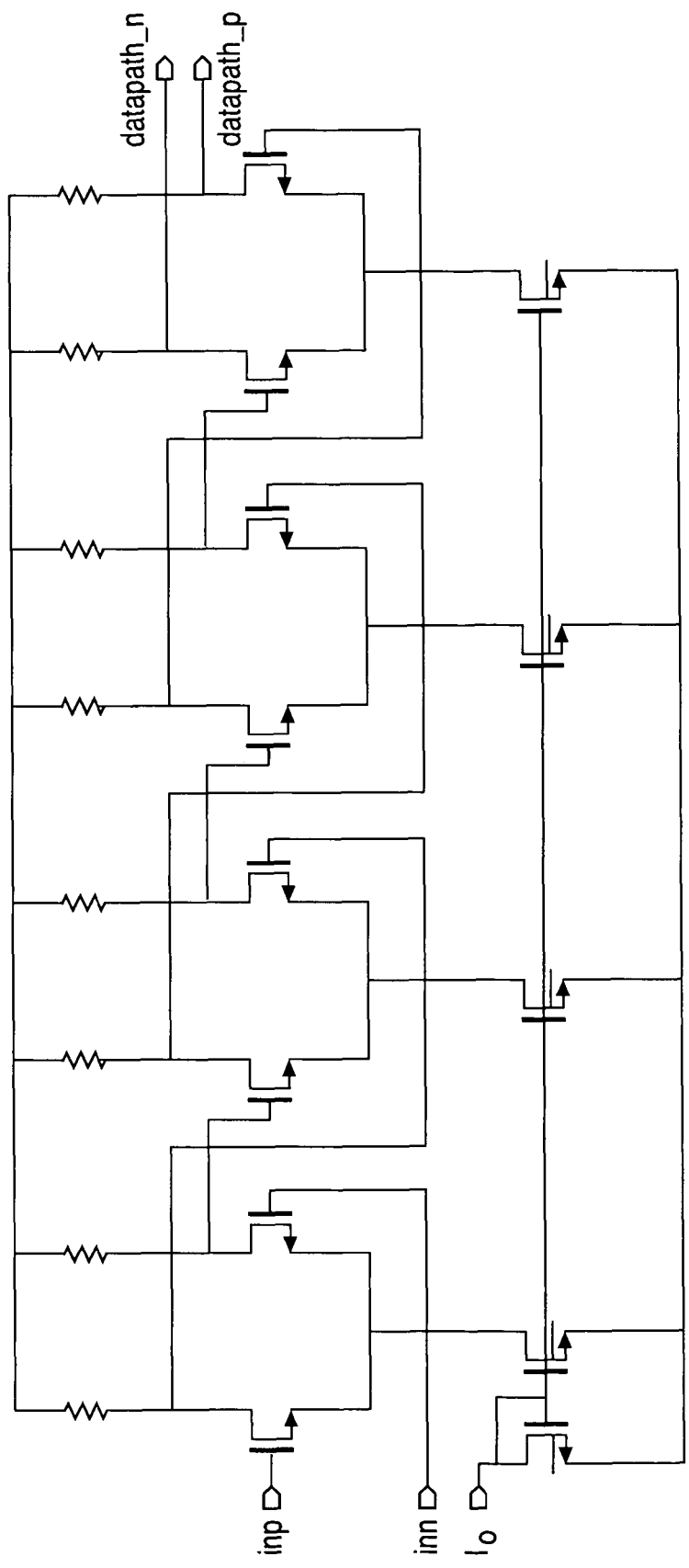
FIG. 6 illustrates a prior art slicer circuit capable of being utilized in an adaptive equalizer circuit.

In order to better understand the operation of the slicer circuit (540, 555) of the present invention, the operation of a prior art slicer circuit will first be described. FIG. 6 illustrates a prior art slicer circuit 600 that is capable of being utilized in an adaptive equalizer circuit. The slicer circuit 600 is a high gain amplifier that gains up the input signal to its full saturation level. The first input to slicer circuit 600 is provided to first input node "inp." The second input to slicer circuit 600 is provided to second input node "inn."

The outputs of slicer circuit 600 are taken from first output node "datapath_n" and from second output node "datapath_p." The output amplitude is usually set by a biasing current designated with the letters "$I_O$" (current starved circuitry). The input port for the biasing current is designated with the letters "$I_O$" in FIG. 6.

Figure 7:
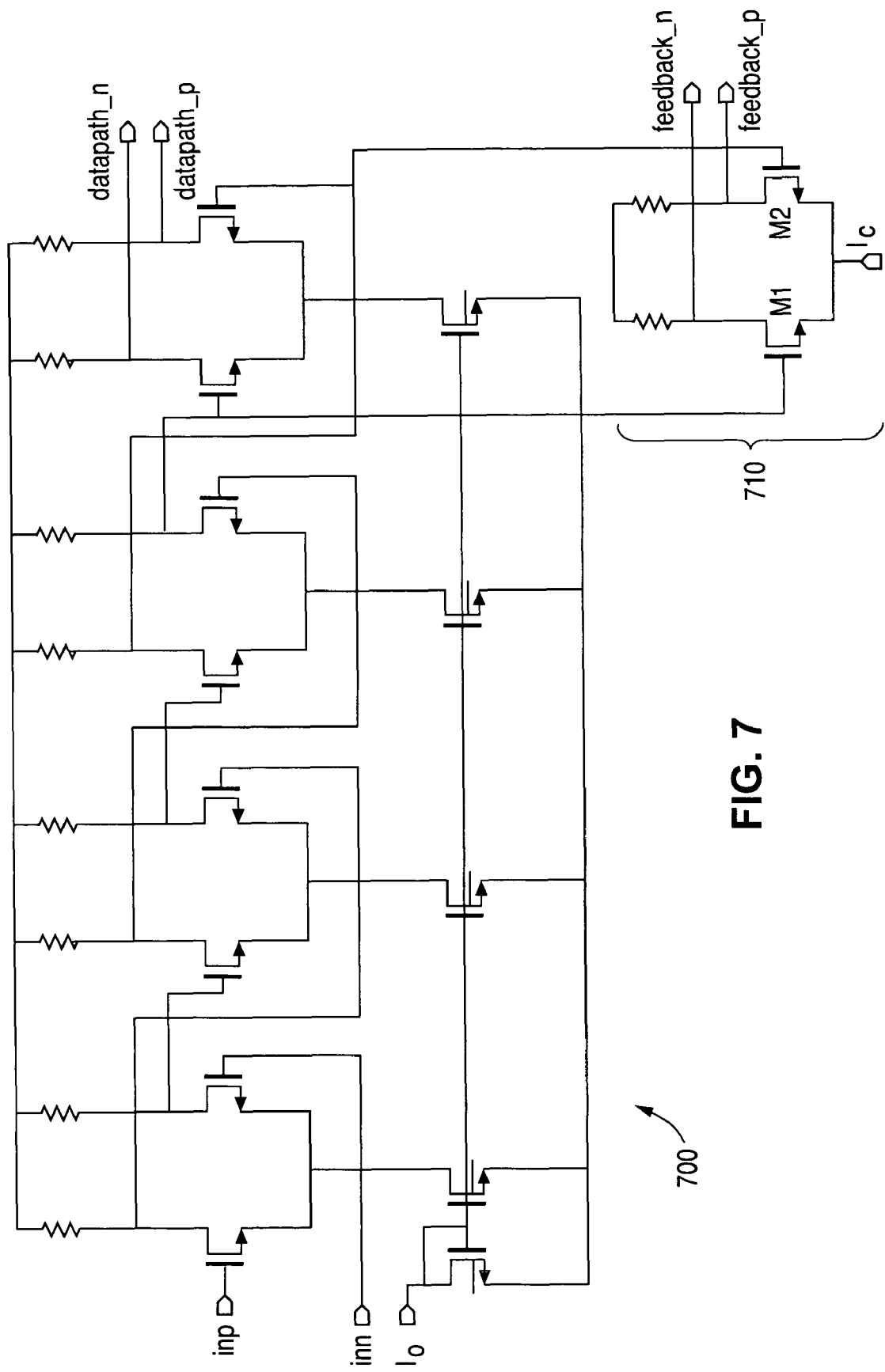
FIG. 7 illustrates an advantageous embodiment of a slicer circuit constructed in accordance with the principles of the present invention.

FIG. 7 illustrates an advantageous embodiment of a slicer circuit 700 constructed in accordance with the principles of the present invention. Slicer circuit 700 comprises the same type of circuitry as the circuitry in prior art slicer circuit 600. Slicer circuit 700 is further capable of tuning the output amplitude of the data signals by modulating the value of the $I_O$ bias current. FIG. 7 shows one possible advantageous embodiment of a circuit for modulating the $I_O$ bias current in response to a control current. The control current is designated with the letters "$I_C$".

The differential amplifier circuit 710 shown in FIG. 7 has an input for the control current $I_C$ located at the common source connection of the two transistors M1 and M2. The feedback outputs of slicer circuit 700 are taken from the first feedback output node "feedback_n" (coupled to the drain of transistor M1) and from the second output node "feedback_p" (coupled to the drain of transistor M2).

If the adaptive equalizer circuit 500 is "alternating current" (AC) decoupled, then the slicer 700 performs a "direct current" (DC) restoration. The same reasoning also applies for a regular amplifier. As indicated above, the slicer 700 has two sets of differential outputs. The first set is for the data path (i.e., "datapath_n" and "datapath_p") and the second set is for the feedback (i.e., "feedback_n" and "feedback_p").

The first set of outputs (i.e., the data path outputs) has a constant output level that is set by the value of the $I_O$ bias current. The second set of outputs (i.e., the feedback outputs)

has an amplitude that is controlled by the value of the $I_C$ control current. The amplitude of the second set of outputs varies according to the length L of the cable.

More precisely, the ratio between the control current $I_C$ and the bias current $I_O$ has to be such that:

$$I_C/I_O=[(Gtx)(GC)]/Gs \qquad (2)$$

The term Gc is a function of the cable that is used.

Figure 8:
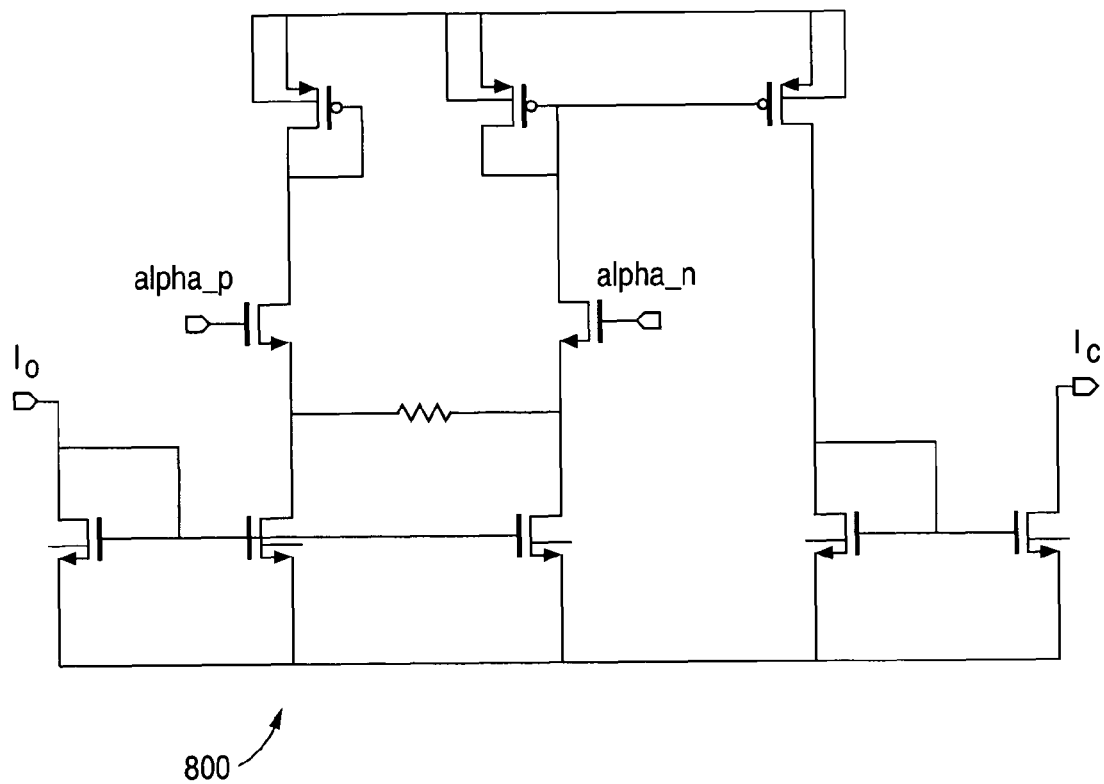
FIG. 8 illustrates an advantageous embodiment of a current modulator circuit constructed in accordance with the principles of the present invention.

FIG. 8 illustrates an advantageous embodiment of a current modulator circuit 800 constructed in accordance with the principles of the present invention. Current modulator circuit 800 comprises an advantageous embodiment of a current modulator for biasing the last stage of the slicer into the feedback path. The current modulator circuit 800 takes the control feedback voltage "α" as an input. The first input node is designated "alpha_p" and the second input node is designated "alpha_n." The current modulator circuit 800 generates the control signal $I_C$ from the control feedback voltage "α" and from the bias current $I_O$.

A method for setting the control loop for optimal equalization will now be described. As previously mentioned, the adaptive equalizer stages are turned on in a thermometer fashion. Consider the general case of N adaptive equalizer stages whose control voltage "$\alpha_i$" can vary between zero ("0") and one ("1"). The first adaptive equalizer stage provides high frequency boost up to a certain channel loss (equivalently, cable length $l_1$). From that point on, the first stage will saturate and the second adaptive equalizer stage will start providing high frequency gain up to a cable length $l_2$, and so on.

Between $l_k$ and $l_{k+1}$ of cable length, stages 1 to k will have the $\alpha_i$ value equal to one ("1"), stage k+1 will have the $\alpha_i$ value between zero ("0") and one ("1") (i.e., the active region) and the downstream stages will be off. That is, the downstream stages will have the $\alpha_i$ value equal to zero ("0") for i>k+1.

At each cable length boundary $l_k$, a measurement of the quantity [(Gtx)(Gc)]/Gs is performed. Let these measurements be designated with the letter $\rho_k$. The $\rho_k$ follow this inequality: $\rho_i > \rho_{i+1}$ for $0 \leq i < N$ (attenuation increases with cable length).

For an α feedback voltage range that goes from zero ("0") to one ("1"), $I_C/I_O = \rho_o$ for α=0 and $I_C/I_O = \rho_N$ for α=1. The $I_C/I_O$ linear dependence to α is:

$$I_C/I_O=(\rho_N-\rho_o)(\alpha)+\rho_o \qquad (3)$$

Solving Equation (3) for a cable length of $l_k$ (0<k<N), the feedback voltage α will have to be:

$$x_k=(\rho_k-\rho_o)/(\rho_N-\rho_o) \qquad (4)$$

At the same time, each $\alpha_k$ at the output of the adaptation control signal generator 550 will ramp linearly from zero ("0") at $\alpha=x_{k-1}$ to one ("1") at $\alpha=x_k$.

Figure 9:
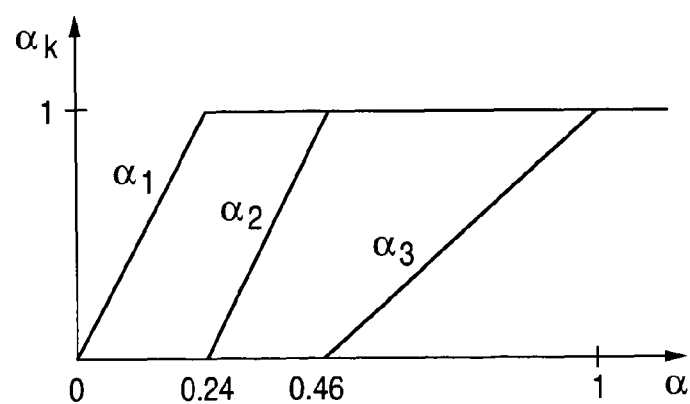
FIG. 9 is a graph illustrating an example of control loop tuning for a three stage adaptive equalizer circuit in accordance with the principles of the present invention.

A control loop tuning example for three adaptive equalizer stages (N=3) is shown in FIG. 9. FIG. 9 is a graph illustrating an example of control loop tuning for a three stage adaptive equalizer circuit in accordance with the principles of the present invention. The first adaptive equalizer stage 510 is tuned for one hundred meters (100 m). The second adaptive equalizer stage 520 is tuned for two hundred meters (200 m). The third adaptive equalizer stage 530 is tuned for five hundred meters (500 m). The cable used was a Belden 1694A 75 ohm coaxial cable.

The corresponding attenuation factor measurements are $\rho_0=1$, $\rho_1=0.9$, $\rho_2=0.81$ and $\rho_3=0.59$. The previous derivation yields the results that $x_1=0.24$ and $x_2=0.46$. A physical interpretation of the solution is that the exponential behavior of the cable with its length (contained within the $\rho_k$ measurements) is linearly interpolated to get the optimum setting given the number of taps (three taps in this case) of the analog equalization.

The analog equalizer circuit 500 of the present invention has an additional advantage that it has increased level of tuning flexibility. The "direct current" (DC) compensation is done at low frequency outside of the data path. Therefore, it is easier to include different sets of parameters for the control loop behavior.

Figure 10:
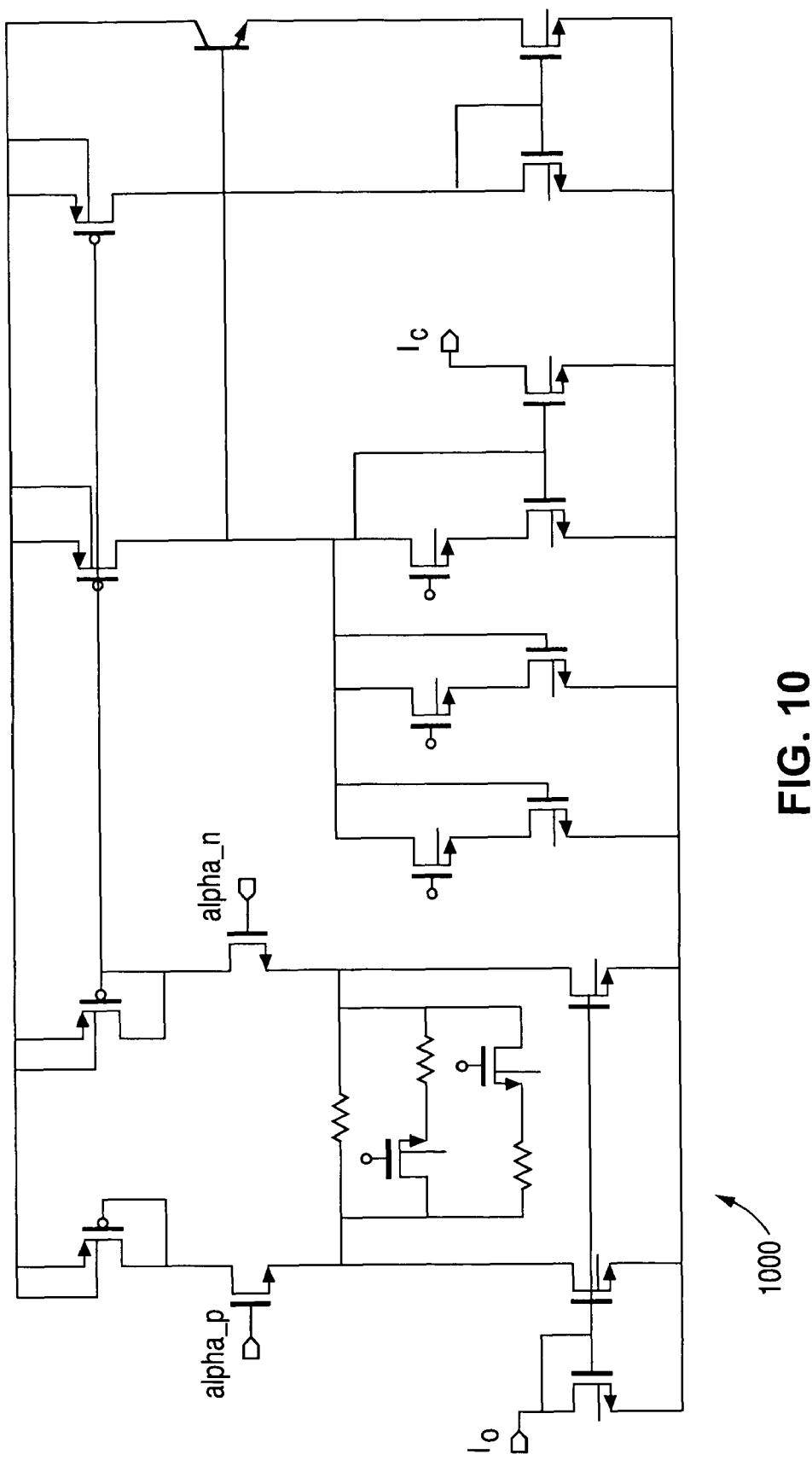
FIG. 10 illustrates an advantageous embodiment of a slicer circuit with range and offset options and a process compensation circuit constructed in accordance with the principles of the present invention.

For example, the range and offset of the DC attenuation performed in the slicer circuit can be adapted given that a digital signal is available. FIG. 10 illustrates an advantageous embodiment of a slicer circuit 1000 with range and offset options and a process compensation circuit constructed in accordance with the principles of the present invention.

As shown in FIG. 10, a process compensation circuit may be inserted into the control loop to increase the robustness of the control loop to process drift. As shown in FIG. 10, a Beta compensation circuit may be inserted into the slicer circuit 1000. In a bipolar process, Beta variation through process and temperature can change the resulting DC attenuation because the gain of the adaptive equalizer stages varies. The slicer circuit 1000 subtracts the base current of a bipolar device. The resulting slicer amplitude is reduced when Beta drops and tracks the lower amplitude at the output of the adaptive equalizer stages.

Figure 11:
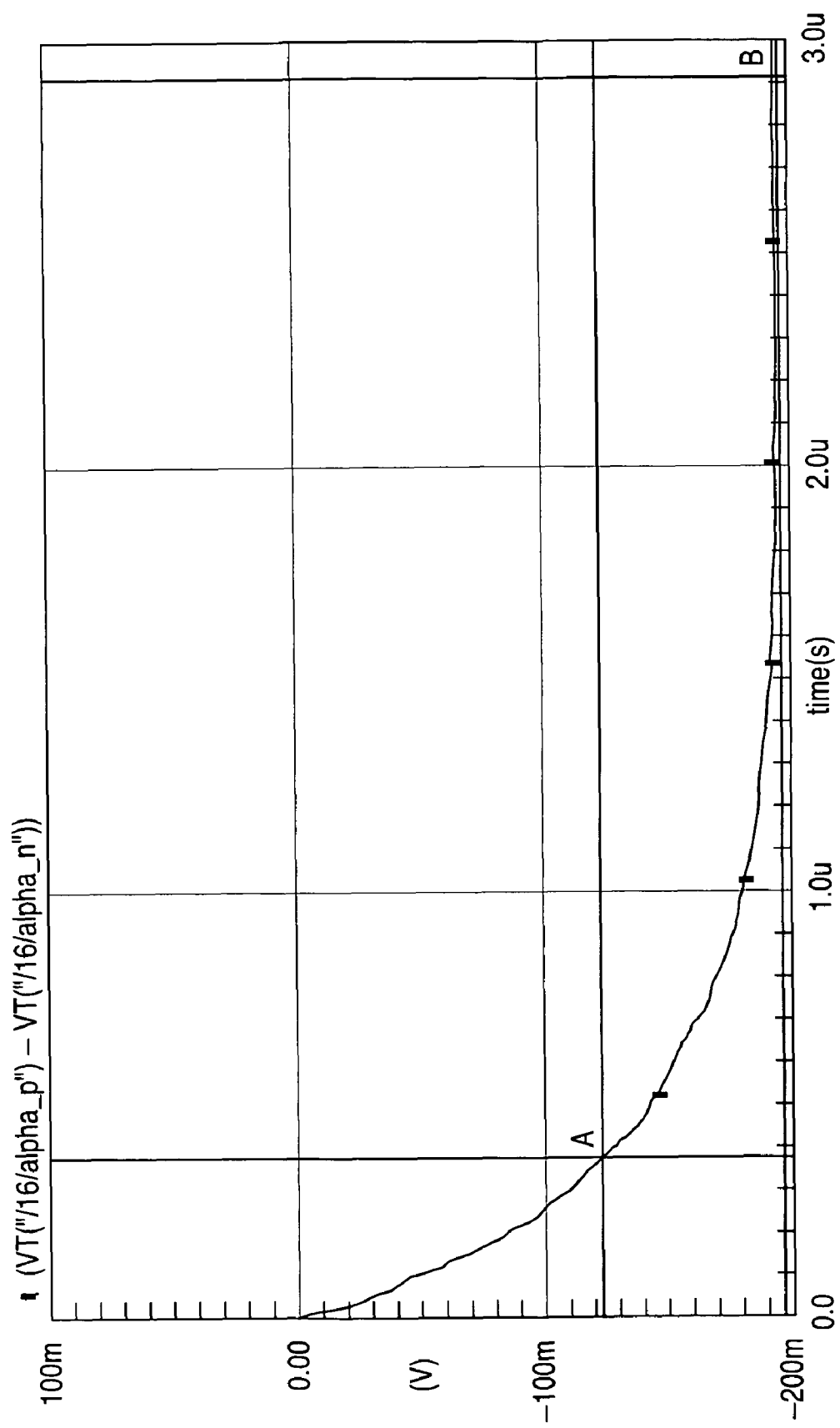
FIG. 11 is a graph illustrating an exemplary simulated control loop convergence in accordance with the principles of the present invention.

A simulated control loop convergence is shown in FIG. 11. FIG. 11 is a graph illustrating an exemplary simulated control loop convergence in accordance with the principles of the present invention. The graph in FIG. 11 shows the voltage value of the quantity ["alpha_p" minus "alpha_n"] over time. As shown in the graph in FIG. 11, the first order loop response is smooth.

Figure 12:
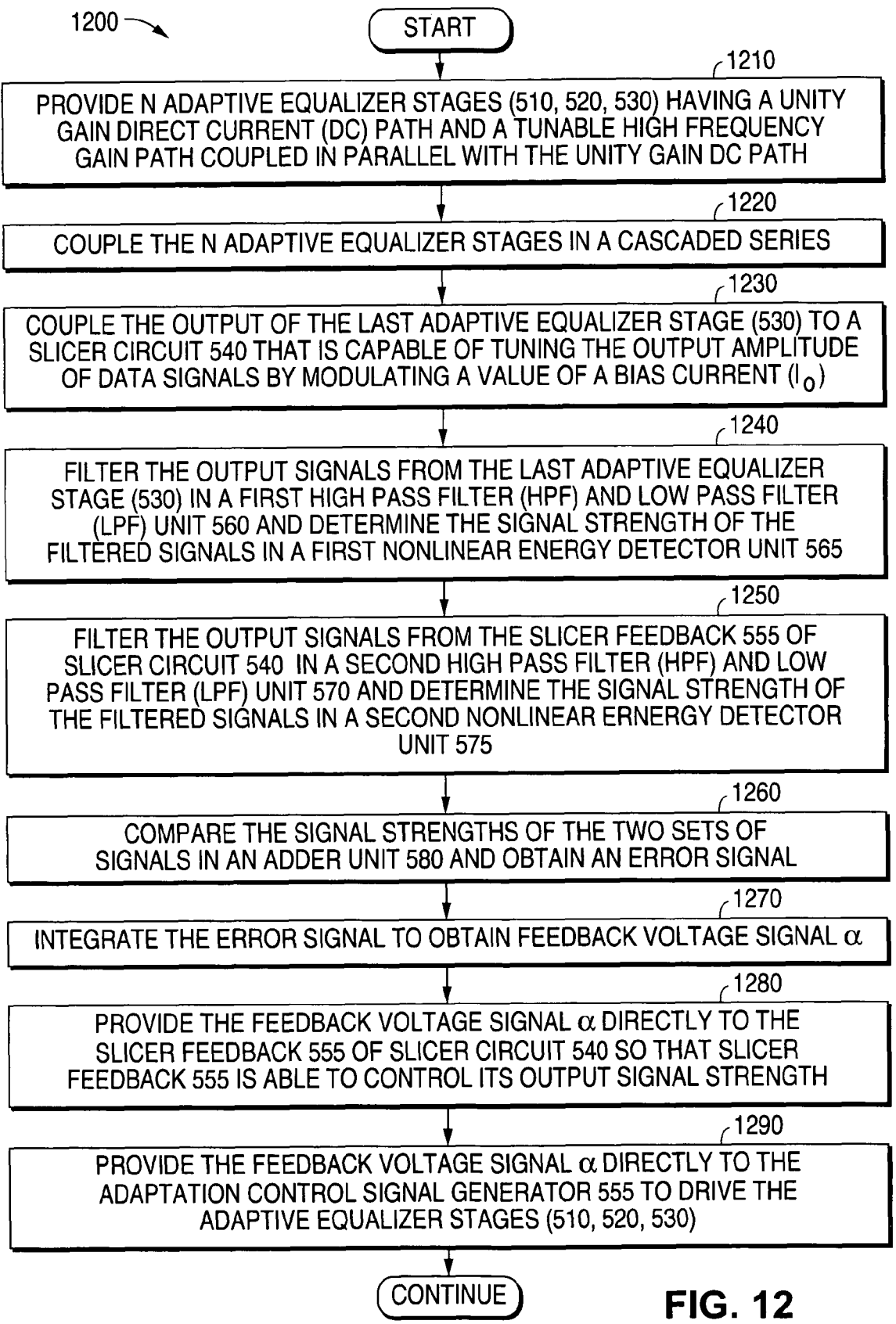
FIG. 12 illustrates a flow chart showing the steps of an advantageous embodiment of the method of the present invention.

FIG. 12 illustrates a flow chart showing the steps of an advantageous embodiment of the method of the present invention. In the first step of the method N adaptive equalizer stages (510, 520, 530) are provided. Each of the N adaptive equalizer stages comprises a unity gain direct current (DC) path and a tunable high frequency gain path that is coupled in parallel with the unity gain DC path (step 1210). Then the N adaptive equalizer stages are coupled in a cascaded series (step 1220). The last adaptive equalizer stage (530) in the series is coupled to the input of a slicer circuit 540 that is capable of tuning the output amplitude of data signals by modulating a value of a bias current $I_O$ (step 1230).

The output signals from the last adaptive equalizer stage (530) are provided to a first high pass filter (HPF) and low pass filter (LPF) unit 560. The filtered signals are then provided to a first nonlinear energy detector unit 565 (e.g., rectifier 565) and the signal strengths of the signals are determined (step 1240).

The output signals from the slicer feedback 555 of the slicer circuit 540 are provided to a second high pass filter (HPF) and low pass filter (LPF) unit 570. The filtered signals are then provided to a second nonlinear energy detector unit 575 (e.g., rectifier 575) and the signal strengths of the signals are determined (step 1250).

Then the signal strengths of the two sets of signals are compared in an adder unit 580 and an error signal is obtained (step 1260). Then the error signal is integrated to obtain the feedback voltage signal "α" ("alpha") (step 1270). The feedback voltage signal "α" is provided directly to the slicer feedback 555 of slicer circuit 540 so that the slicer feedback 555 is able to control its output signal strength (step 1280).

The feedback voltage signal "α" is also provided directly to the adaptation control signal generator 555. The adaptation control signal generator 555 drives the N adaptive equalizer stages (510, 520, 530) (step 1290).

The adaptive equalizer circuit 500 of the present invention possesses several advantageous features. The adaptive equalizer circuit 500 comprises a single equalizer adaptation control loop that is unconditionally stable. The equalizer adaptation control loop converges to a unique solution point.

The equalizer adaptation control loop controls the frequency response of a cascaded series of adaptive equalizer stages in thermometer fashion to compensate for the attenuation of a lossy channel. The equalizer adaptation control loop compensates for the direct current (DC) loss in the lossy channel with the same feedback loop that controls the adaptive equalizer stages. The equalizer adaptation control loop accomplishes this by modulating a bias current in the slicer circuit to scale the low frequency feedback with adaptation coefficients that correlate with channel length.

Although the present invention has been described with an exemplary embodiment, various changes and modifications may be suggested to one skilled in the art. It is intended that the present invention encompass such changes and modifications as fall within the scope of the appended claims.

What is claimed is:

1. An adaptive equalization circuit comprising:
    a plurality of adaptive equalizer stages coupled in a cascaded series;
    a slicer circuit coupled to a last of the adaptive equalizer stages in the cascaded series; and
    a single equalizer adaptation control loop coupled to each of the adaptive equalizer stages and coupled directly to the slicer circuit, wherein the single equalizer adaptation control loop is configured to converge to a unique solution point and to control both the adaptive equalizer stages and the slicer circuit;
    wherein the slicer circuit comprises circuitry configured to tune an output amplitude of data signals within the slicer circuit by modulating a bias of the slicer circuit.

2. The adaptive equalization circuit as set forth in claim 1, wherein the single equalizer adaptation control loop comprises:
    a first filter unit coupled to an output of the last adaptive equalizer stage;
    a first nonlinear energy detector unit coupled to an output of the first filter unit;
    a second filter unit coupled to a feedback output of the slicer circuit;
    a second nonlinear energy detector unit coupled to an output of the second filter unit;
    an adder unit coupled to outputs of the first and second nonlinear energy detector units, the adder unit configured to obtain an error signal based on signals received from the first and second nonlinear energy detector units;
    an integrator unit coupled to an output of the adder unit, the integrator unit configured to integrate the error signal to obtain a feedback signal;
    an adaptation control signal generator coupled to an output of the integrator unit, the adaptation control al venerator configured to use the feedback signal to control each of the adaptive equalizer stages; and
    a signal line configured to provide the feedback signal to the circuitry configured to tune the output amplitude of the data signals within the slicer circuit.

3. The adaptive equalization circuit as set forth in claim 1, wherein the single equalizer adaptation control loop is configured to control a frequency response of each of the adaptive equalizer stages to compensate for an attenuation of a signal in a lossy channel.

4. The adaptive equalization circuit as set forth in claim 3, wherein the slicer circuit is configured to receive a feedback signal from the single equalizer adaptation control loop, and wherein the slicer circuit is configured to compensate for a low frequency direct current attenuation loss of the signal in the lossy channel.

5. The adaptive equalization circuit as set forth in claim 1, wherein the single equalizer adaptation control loop is configured to control a frequency response of each of the adaptive equalizer stages to compensate for an attenuation of a signal in a lossy channel; and
    wherein the single equalizer adaptation control loop is configured to modulate the bias in the slicer circuit to scale a low frequency feedback signal with adaptation coefficients that correlate with channel length.

6. The adaptive equalization circuit as set forth in claim 5, wherein the slicer circuit comprises:
    a first set of differential outputs for data path signals; and
    a second set of differential outputs for feedback signals.

7. The adaptive equalization circuit as set forth in claim 6, wherein the data path signals provided at the first set of differential outputs have a constant output level that is set by the bias; and
    wherein the feedback signals provided at the second set of differential outputs have an amplitude that is controlled by a control signal, wherein the control signal is derived from a feedback signal from the single equalizer adaptation control loop.

8. The adaptive equalization circuit as set forth in claim 7, wherein a ratio of the control signal to of the bias is given by:

$$I_C/I_O = [(Gtx)(Gc)]/Gs$$

where $I_C$ represents a control current, $I_O$ represents a bias current, Gtx represents an amplitude of a cable driver output, Gc represents a DC gain of the channel, and Gs represents an amplitude of the slicer output.

9. The adaptive equalization circuit of claim 1, wherein the single equalizer adaptation control loop is configured to control the adaptive equalizer stages and the slicer circuit by:
    providing a feedback signal to a feedback circuit of the slicer circuit; and
    providing the feedback signal to an adaptation control signal generator configured to use the feedback signal to drive the adaptive equalizer stages.

10. An adaptive equalization circuit comprising:
    a plurality of adaptive equalizer stages coupled in a cascaded series;
    a slicer circuit coupled to a last of the adaptive equalizer stages in the cascaded series; and
    a single equalizer adaptation control loop coupled to each of the adaptive equalizer stages and to the slicer circuit, wherein the single equalizer adaptation control loop is configured to control both the adaptive equalizer stages and the slicer circuit;
    wherein the single equalizer adaptation control loop comprises:
        a first filter unit coupled to an output of the last adaptive equalizer stage, the first filter unit comprising a first high pass filter and low pass filter unit;
        a first nonlinear energy detector unit coupled to an output of the first filter unit, the first nonlinear energy detector unit comprising a first full wave rectification rectifier;

a second filter unit coupled to a feedback output of the slicer circuit, the second filter unit comprising a second high pass filter and low pass filter unit; and a second nonlinear energy detector unit coupled to an output of the second filter unit, the second nonlinear energy detector unit comprising a second full wave rectification rectifier.

11. The adaptive equalization circuit as set forth in claim 10, wherein the single equalizer adaptation control loop further comprises:

an adder unit having a first input coupled to an output of the first nonlinear energy detector unit and having a second input coupled to an output of the second nonlinear energy detector unit, wherein the adder unit is configured to obtain an error signal from signals received from the first and second nonlinear energy detector units.

12. The adaptive equalization circuit as set forth in claim 11, wherein the single equalizer adaptation control loop further comprises:

an integrator unit having an input coupled to an output of the adder unit, wherein the integrator unit is configured to integrate the error signal to obtain a feedback signal; and an adaptation control signal generator having an input coupled to an output of the integrator unit, the adaptation control signal generator configured to use the feedback signal to control a frequency response of each of the adaptive equalizer stages.

13. The adaptive equalization circuit as set forth in claim 12, wherein the single equalizer adaptation control loop further comprises:

a signal line from the output of the integrator unit to a slicer feedback portion of the slicer circuit, the signal line configured to provide the feedback signal from the integrator unit to the slicer feedback portion of the slicer circuit.

14. The adaptive equalization circuit of claim 10, wherein the slicer circuit is configured to tune an output amplitude of data signals within the slicer circuit by modulating of a bias of the slicer circuit.

15. An adaptive equalization circuit comprising:

a plurality of adaptive equalizer stages coupled in a cascaded series;

a slicer circuit coupled to a last of the adaptive equalizer stages in the cascaded series; and a single equalizer adaptation control loop coupled to each of the adaptive equalizer stages and to the slicer circuit, wherein the single equalizer adaptation control loop is configured to control both the adaptive equalizer stages and the slicer circuit, wherein the single equalizer adaptation control loop comprises:

a first filter unit coupled to an output of the last adaptive equalizer stage;

a first nonlinear energy detector unit coupled to an output of the first filter unit;

a second filter unit coupled to a feedback output of the slicer circuit;

a second nonlinear energy detector unit coupled to an output of the second filter unit;

an adder unit configured to obtain an error signal from signals received from the first and second nonlinear energy detector units;

an integrator unit configured to integrate the error signal to obtain a feedback signal;

a modulator circuit within the slicer circuit, wherein the modulator circuit is configured to generate a control signal for a slicer feedback portion of the slicer circuit using the feedback signal and a bias of the slicer circuit; and an adaptation control signal generator configured to use the feedback signal to control each of the adaptive equalizer stages.

16. The adaptive equalization circuit of claim 15, wherein the slicer circuit is configured to tune an output amplitude of data signals within the slicer circuit by modulating the bias of the slicer circuit.

17. A method for providing adaptive equalization in an adaptive equalization circuit, the adaptive equalization circuit comprising a plurality of adaptive equalizer stages coupled in a cascaded series, a slicer circuit coupled to a last of the adaptive equalizer stages in the cascaded series, and a single equalizer adaptation control loop coupled to each of the adaptive equalizer stages and to the slicer circuit, the method comprising the steps of:

controlling a frequency response of each of the adaptive equalizer stages using the single equalizer adaptation control loop to compensate for an attenuation of a signal in a lossy channel;

compensating in the slicer circuit for a low frequency direct current attenuation loss of the signal in the lossy channel; and tuning an output amplitude of data signals within the slicer circuit by modulating a bias of the slicer circuit using the single equalizer adaptation control loop.

18. The method as set forth in claim 17, further comprising the step of:

modulating the bias in the slicer circuit to scale a low frequency feedback signal with adaptation coefficients that correlate with channel length.

19. The method as set forth in claim 17, further comprising the step of:

controlling an amplitude of feedback signals in the slicer circuit using a control signal, wherein the control signal is derived from a feedback signal from the single equalizer adaptation control loop.

20. The method as set forth in claim 19, further comprising the step of:

operating the single equalizer adaptation control loop with a ratio of the control signal to the bias that is given by:

$$I_C/I_O = [(Gtx)(Gc)]/Gs$$

where $I_C$ represents a control current, $I_O$ represents a bias current, Gtx represents an amplitude of a cable driver output, Gc represents a DC gain of the channel, and Gs represents an amplitude of the slicer output.

* * * * *